(12) United States Patent
Wrighton et al.

(10) Patent No.: US 11,697,982 B2
(45) Date of Patent: *Jul. 11, 2023

(54) SUBMERSIBLE CANNED MOTOR PUMP

(71) Applicant: Saudi Arabian Oil Company, Dhahran (SA)

(72) Inventors: Christopher Wrighton, Inverurie (GB); Sakethraman Mahalingam, Aberdeen (GB); Krzysztof Karol Machocki, Aberdeen (GB)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 379 days.

This patent is subject to a terminal disclaimer.

(21) Appl. No.: 17/002,434

(22) Filed: Aug. 25, 2020

(65) Prior Publication Data

US 2022/0065081 A1 Mar. 3, 2022

(51) Int. Cl.
*E21B 43/12* (2006.01)
*E21B 47/008* (2012.01)
(Continued)

(52) U.S. Cl.
CPC .......... *E21B 43/128* (2013.01); *E21B 47/008* (2020.05); *F04D 13/0626* (2013.01);
(Continued)

(58) Field of Classification Search
CPC .. E21B 43/128; E21B 47/008; F04D 13/0626; F04D 13/0633; F04D 13/10;
(Continued)

(56) References Cited

U.S. PATENT DOCUMENTS

| | | | |
|---|---|---|---|
| 2,319,730 A | | 5/1943 | Garraway |
| 2,722,892 A | * | 11/1955 | French ................... F04D 13/10 |
| | | | 417/357 |

(Continued)

FOREIGN PATENT DOCUMENTS

| | | |
|---|---|---|
| CN | 2282745 Y | 5/1998 |
| CN | 201038872 Y | 3/2008 |

(Continued)

OTHER PUBLICATIONS

International Search Report for PCT/IB2021/050689, 5 pages (dated May 21, 2021).

(Continued)

*Primary Examiner* — Devon C Kramer
*Assistant Examiner* — Joseph S. Herrmann
(74) *Attorney, Agent, or Firm* — Osha Bergman Watanabe & Burton LLP (57) ABSTRACT

Systems and methods for producing fluids from a subterranean well include an electrical submersible pump assembly with a motor-pump unit. The motor-pump unit has a motor housing and a stator is located within the motor housing. The stator has a stator body with an interior cavity. A rotor assembly is located within the interior cavity of the stator. The rotor assembly includes a rotor shaft extending along the central axis of the stator, a rotor member, and an intermediate rotor bearing assembly. The rotor member and the intermediate rotor bearing assembly circumscribe the rotor shaft. An impeller is mounted on the rotor shaft and located within the interior cavity of the stator. A liner with a polygonal cross section is located along an interior surface of the interior cavity. The liner is secured to the motor housing and seals the stator body from a wellbore fluid.

21 Claims, 7 Drawing Sheets

(51) Int. Cl.
*F04D 13/10* (2006.01)
*H02K 5/132* (2006.01)
*H02K 5/167* (2006.01)
*F04D 13/06* (2006.01)
*H02K 5/128* (2006.01)

(52) U.S. Cl.
CPC ......... *F04D 13/0633* (2013.01); *F04D 13/10* (2013.01); *H02K 5/1285* (2013.01); *H02K 5/132* (2013.01); *H02K 5/1675* (2013.01)

(58) Field of Classification Search
CPC ........ H02K 5/12; H02K 5/128; H02K 5/1285; H02K 5/132; H02K 5/1675
See application file for complete search history.

(56) References Cited

U.S. PATENT DOCUMENTS

| | | | |
|---|---|---|---|
| 5,348,452 A | 9/1994 | Yamamoto et al. | |
| 5,549,447 A | 8/1996 | Bevington | |
| 6,538,353 B2* | 3/2003 | Marioni | H02K 21/16 |
| | | | 310/86 |
| 8,629,592 B2 | 1/2014 | Johnson et al. | |
| 9,577,494 B2 | 2/2017 | Mei et al. | |
| 10,164,500 B2 | 12/2018 | Strattan et al. | |
| 10,423,172 B2* | 9/2019 | Niederhauser | G01F 1/6842 |
| 11,152,831 B2* | 10/2021 | Wrighton | F16C 17/02 |
| 2002/0158545 A1* | 10/2002 | Marioni | F04D 13/064 |
| | | | 310/261.1 |
| 2003/0145989 A1* | 8/2003 | Shaw | E21B 43/128 |
| | | | 166/265 |
| 2005/0036895 A1 | 2/2005 | Tremain et al. | |
| 2010/0038142 A1 | 2/2010 | Snyder et al. | |
| 2013/0207492 A1 | 8/2013 | Chamberlin et al. | |
| 2013/0272898 A1* | 10/2013 | Toh | F04D 13/10 |
| | | | 417/44.1 |
| 2015/0021014 A1* | 1/2015 | Hughes | E21B 47/01 |
| | | | 166/250.01 |
| 2017/0058664 A1* | 3/2017 | Xiao | E21B 47/06 |
| 2017/0264158 A1 | 9/2017 | Li et al. | |
| 2017/0264179 A1 | 9/2017 | Khotsyanov et al. | |
| 2018/0179872 A1 | 6/2018 | Filatov et al. | |
| 2018/0363660 A1 | 12/2018 | Klahn | |
| 2019/0032459 A1 | 1/2019 | Pires et al. | |
| 2019/0186245 A1* | 6/2019 | Bellmyer | F04D 29/588 |
| 2020/0032630 A1 | 1/2020 | Artinian et al. | |

FOREIGN PATENT DOCUMENTS

| | | |
|---|---|---|
| GB | 2502880 A | 12/2013 |
| WO | WO-2018/022198 A1 | 2/2018 |
| WO | WO-2020/176707 A1 | 9/2020 |
| WO | WO-2022/043765 A1 | 3/2022 |

OTHER PUBLICATIONS

Written Opinion for PCT/IB2021/050689, 9 pages (dated May 21, 2021).
International Search Report for PCT/US2020/020041, 4 pages (dated May 25, 2020).
Written Opinion for PCT/US2020/020041, 6 pages (dated May 25, 2020).

\* cited by examiner

SUBMERSIBLE CANNED MOTOR PUMP

FIELD

The disclosure relates generally to subterranean well development operations and in particular, to electrical submersible pump assemblies with canned motors.

BACKGROUND

One method of producing hydrocarbon fluids from a wellbore that lacks sufficient internal pressure for natural production is to utilize an artificial lift method, such as an electrical submersible pump. A string of tubing or pipe known as a production string suspends the submersible pumping device near the bottom of the wellbore proximate to the producing formation. The submersible pumping device is operable to retrieve production zone fluid, impart a higher pressure into the fluid and discharge the pressurized production zone fluid into production tubing. Pressurized wellbore fluid rises towards the surface motivated by difference in pressure. Electrical submersible pumps can be useful, for example, in low gas to oil ratio operations and in aged fields where there is a loss of energy and the hydrocarbons can no longer reach the surface naturally.

SUMMARY

Some current electrical submersible pump assemblies have an electric motor with a rotor and stator. In such motors, corrosive fluids, such as well fluids and hydrogen sulfide, may enter the space between the rotor and the stator damaging the stator components. Some current motors of electric submersible pump systems utilize seals to prevent wellbore and other fluids from entering the stator body. However, such seals are prone to leaks during operation due to mechanical and process issues outside a pump's operating envelope or during handling of the electrical submersible pump system during installation. Embodiments disclosed in this specification provide systems and methods for hermetically isolating a stator body from wellbore fluids.

An example system is for producing fluids from a subterranean well. The system includes an electrical submersible pump assembly with a motor-pump unit. The motor-pump unit has a motor housing. The motor housing is an elongated member. The motor-pump unit has a stator located within the motor housing. The stator has a stator body with an interior cavity extending along a central axis of the stator. The motor-pump unit has a rotor assembly located within the interior cavity of the stator. The rotor assembly includes a rotor shaft, a rotor member, and an intermediate rotor bearing assembly. The rotor member and the intermediate rotor bearing assembly circumscribe the rotor shaft. The motor-pump unit has an impeller mounted on the rotor shaft and located within the interior cavity of the stator. The impeller circumscribes the rotor shaft. The motor-pump unit has a liner located along an interior surface of the interior cavity. The liner is a thin walled member that is secured to the motor housing and hermetically seals the stator body from a wellbore fluid. The liner has a polygonal cross section.

The rotor shaft may be a rotating elongated member that extends along the central axis of the stator. The rotor shaft may be a stationary member that extends along the central axis of the stator.

The intermediate rotor bearing assembly may be a ring shaped member with a polygonal shaped outer series of edges that corresponds to the polygonal cross section of the liner and with a radial bearing having an inner diameter shape that corresponds to an outer diameter shape of the rotor shaft. The intermediate rotor bearing assembly may be rotationally static relative to the stator, and the rotor shaft may rotate relative to the intermediate rotor bearing assembly.

The liner may be formed of a non-magnetic material. The liner may be welded at an uphole end of the motor-pump unit and may be welded at a downhole end of the motor-pump unit.

The motor-pump unit may have an axial length in a range of 0.05 to 10 meters and may have an outer diameter in a range of 0.025 to 1 meters. The motor-pump unit may include a distributed acoustic sensing system, a distributed temperature sensing system, or a fiber optic strain sensing system.

The system may include a CMP gauge. The CMP gauge may include a pressure sensor, a temperature sensor, a water cut sensor, an electrical current meter, or a flow meter. The CMP gauge may include a V-cone flow meter, a vortex flow meter, an ultrasound probe, or a thermal anemometer.

The system may include a flow meter positioned at an inlet of the system, a CMP gauge in fluid connection with the flow meter, and a flow port in fluid connection with the CMP gauge and in fluid connection with the motor-pump unit. The system may be configured such that fluid enters the system through the flow meter, subsequently traverses the CMP gauge, subsequently traverses the flow port, and subsequently traverses the motor-pump unit.

An example method is for producing fluids from a subterranean well. The method includes providing an electrical submersible pump assembly with a motor-pump unit and a seal section.

The motor-pump unit has a motor housing. The motor housing is an elongated member. The motor-pump unit has a stator located within the motor housing. The stator has a stator body with an interior cavity extending along a central axis of the stator.

The motor-pump unit has a rotor assembly located within the interior cavity of the stator. The rotor assembly includes a rotor shaft, a rotor member, and an intermediate rotor bearing assembly. The rotor member and the intermediate rotor bearing assembly circumscribe the rotor shaft. The rotor shaft is an elongated member that extends along the central axis of the stator.

The motor-pump unit has an impeller mounted on the rotor shaft and located within the interior cavity of the stator where the impeller circumscribes the rotor shaft.

The motor-pump unit has a liner located along an interior surface of the interior cavity, the liner being a thin walled member that is secured to the motor housing and hermetically seals the stator body from a wellbore fluid, where the liner has a polygonal cross section;

The method includes lowering the electrical submersible pump assembly into the subterranean well with a deployment string.

The method includes operating the electrical submersible pump assembly to lift production fluids in a direction out of the subterranean well.

The method may include providing the intermediate rotor bearing assembly that is a ring shaped member with a polygonal shaped outer series of edges that corresponds to the polygonal cross section of the liner and with a radial bearing having an inner diameter shape that corresponds to an outer diameter shape of the rotor shaft.

Operating the electrical submersible pump assembly may include rotating the rotor shaft. The rotor shaft may rotate relative to the intermediate rotor bearing assembly and the intermediate rotor bearing assembly may be rotationally static relative to the stator.

The liner may be formed of a non-magnetic material. The liner may be welded at an uphole end of the motor and may be welded at a downhole end of the motor.

The motor-pump unit may have an axial length in a range of 0.05 to 10 meters and may have an outer diameter in a range of 0.025 to 1 meters. The motor-pump unit may include a distributed acoustic sensing system, a distributed temperature sensing system, or a fiber optic strain sensing system.

The submersible pump assembly may include a CMP gauge. The CMP gauge may include a pressure sensor, a temperature sensor, a water cut sensor, an electrical current meter, or a flow meter. The CMP gauge may include a V-cone flow meter, a vortex flow meter, an ultrasound probe, or a thermal anemometer. The submersible pump assembly may include a flow meter positioned at an inlet of a system including the submersible pump assembly, a CMP gauge in fluid connection with the flow meter, and a flow port in fluid connection with the CMP gauge and in fluid connection with the motor-pump unit. The system may be configured such that fluid enters the system through the flow meter, subsequently traverses the CMP gauge, subsequently traverses the flow port, and subsequently traverses the motor-pump unit.

Any two or more of the features described in this specification, including in this summary section, may be combined to form implementations not specifically described in this specification.

At least part of the processes and systems described in this specification may be controlled by executing on one or more processing devices instructions that are stored on one or more non-transitory machine-readable storage media. Examples of non-transitory machine readable storage media include but are not limited to read-only memory, an optical disk drive, memory disk drive, and random access memory. At least part of the processes and systems described in this specification may be controlled using a computing system comprised of one or more processing devices and memory storing instructions that are executable by the one or more processing devices to perform various control operations.

BRIEF DESCRIPTION OF THE DRAWINGS

So that the manner in which the above-recited features, aspects and advantages of the embodiments of this disclosure, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only example embodiments of the disclosure and are, therefore, not to be considered limiting of the disclosure's scope, for the disclosure may admit to other equally effective embodiments.

DESCRIPTION OF CERTAIN EMBODIMENTS OF THE INVENTION

Embodiments of the present disclosure will now be described more fully hereinafter with reference to the accompanying drawings which illustrate embodiments of the disclosure. Systems and methods of this disclosure may, however, be embodied in many different forms and should not be construed as limited to the illustrated embodiments described in this specification. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments or positions.

In the following discussion, numerous specific details are set forth to provide a thorough understanding of the present disclosure. However, it will be obvious to those skilled in the art that embodiments of the present disclosure can be practiced without such specific details. Additionally, for the most part, details concerning well drilling, reservoir testing, well completion and the like have been omitted inasmuch as such details are not considered necessary to obtain a complete understanding of the present disclosure, and are considered to be within the skills of persons skilled in the relevant art.

Figure 1:
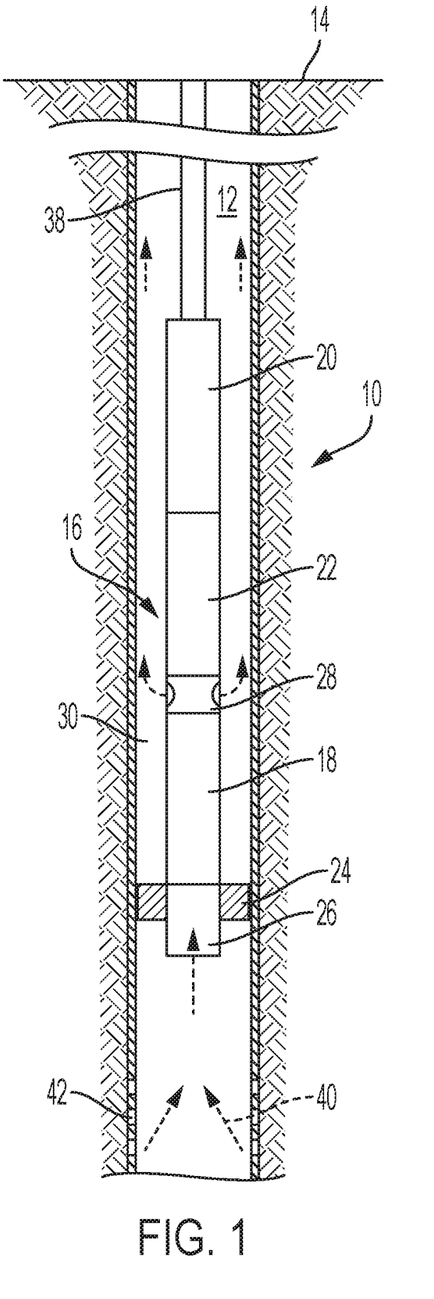
FIG. 1 is a section view of a subterranean well having an electrical submersible pump assembly with canned motor, in accordance with an embodiment of this disclosure.

Looking at FIG. 1, subterranean well 10 has wellbore 12 that extends to an earth's surface 14. Subterranean well 10 may be an offshore well or a land based well and may be used for producing fluids, such as producing hydrocarbons, from subterranean hydrocarbon reservoirs. Subterranean well 10 may be an offshore or a land based oil well, geothermal well, or water well. Electrical submersible pump assembly 16 may be located within wellbore 12. Electrical submersible pump assembly 16 may provide artificial lift to production fluids. Electrical submersible pump assembly 16 may include pump 18 and motor 20.

Referring to FIG. 1, pump 18 may be, for example, a rotary pump such as a centrifugal pump. Pump 18 may be a progressing cavity pump, which has a helical rotor that rotates within an elastomeric stator, or other type of pump known in the art for use with an electrical submersible pump assembly. Pump 18 may include one or more stages, which are made up of impellers and diffusers. The impeller, which is rotating, may add energy to the fluid to provide head, and the diffuser, which is stationary, converts the kinetic energy of fluid from the impeller into potential energy (head). The pump stages may be stacked in series to form a multi-stage system that is contained within a pump housing. The sum of head generated by each individual stage is summative so that the total head developed by the multi-stage system increases linearly from the first to the last stage.

Pump 18 may be located within wellbore 12 and oriented to selectively boost the pressure of the production fluids traveling from the wellbore 12 towards the earth's surface 14 so that production fluids can travel more efficiently to the earth's surface 14 through wellbore 12.

Motor 20 may be also located within the wellbore 12 and provides power to pump 18. Electrical submersible pump assembly 16 may include seal section 22. Seal section 22 may be located between pump 18 and motor 20. Seal section 22 may absorb the thrust load from pump 18, transmit power from motor 20 to pump 18, and equalize pressure with the well, while motor dielectric oil expands and contracts during operation preventing wellbore fluid from entering motor 20. Wellbore fluids may include production fluids, motor oil, treatment fluids, or other fluids utilized in subterranean development operations. In the example embodiment of FIG. 1, electrical submersible pump assembly 16 is shown with the seal section 22. In some embodiments, electrical submersible pump assembly 16 does not include seal section 22. Instead, motor 20 may drive the pump 18 without a seal section or protector located between motor 20 and pump 18. In such an embodiment, wellbore fluids may pass through the rotor cavity, lubricating the rotor bearings and cooling the inner diameter of the stator.

Downhole packer 24 may be located within wellbore 12 and may be used to isolate the section of wellbore 12 that is downhole of downhole packer 24 from the section of wellbore 12 that contains electrical submersible pump assembly 16. Downhole packer 24 may seal around the inner diameter surface of wellbore 12 and may circumscribe stinger 26. Downhole packer 24 may be, for example, a polished bore receptacle type of packer, allowing bypass stinger 26 to sting in so that stinger 26 extends through downhole packer 24.

Electrical submersible pump assembly 16 may further include discharge 28 that is located between pump 18 and seal section 22. Discharge 28 may direct fluid that has passed through pump 18 into annular space 30 between an outer diameter surface of electrical submersible pump assembly 16 and an inner diameter of wellbore 12. Fluid within annular space 30 uphole of downhole packer 24 may be delivered to the surface 14 via the annular space 30.

Electrical submersible pump assembly 16 may be deployed via cable (for example, as a cable deployed canned motor pump (CMP)) or may be deployed via power coil or coiled tubing. Electrical submersible pump assembly 16 may be lowered into wellbore 12 with deployment string 38. Deployment string 38 may be, for example, coiled tubing, a wireline, or a cable. Deployment string 38 may support electrical submersible pump assembly 16 within wellbore 12. In embodiments where deployment string 38 is coiled tubing, the coiled tubing may house a power cable, for example, as an alternative to a metal-clad/sheathed power cable. Fluid may flow to the surface via an annulus formed between coiled tubing/power cable and wellbore 12, for example, like annular space 30.

As indicated by arrows 40, reservoir fluids may travel from perforations 42 that are downhole of downhole packer 24 and into stinger 26 to pass by downhole packer 24. The reservoir fluids may travel through pump 18. Discharge 28 directs the production fluid out of pump 18 and into annular space 30. The production fluid may continue to travel in an uphole direction past seal section 22 and motor 20 to be produced to the surface 14 and treated and processed using conventional methods.

FIG. 1 provides an example embodiment of electrical submersible pump assembly 16. In the example configuration of FIG. 1, electrical submersible pump assembly 16 is shown as an inverted assembly with motor 20 uphole of pump 18. In some embodiments, the arrangement of each of the components of electrical submersible pump assembly 16 may be differently configured. As an example, electrical submersible pump assembly 16 may be a conventional assembly with pump 18 located uphole of motor 20. Alternately, pump 18 may be integrated with motor 20. In other embodiments, there may be no packers, or there may be more than one packer.

Figure 2:
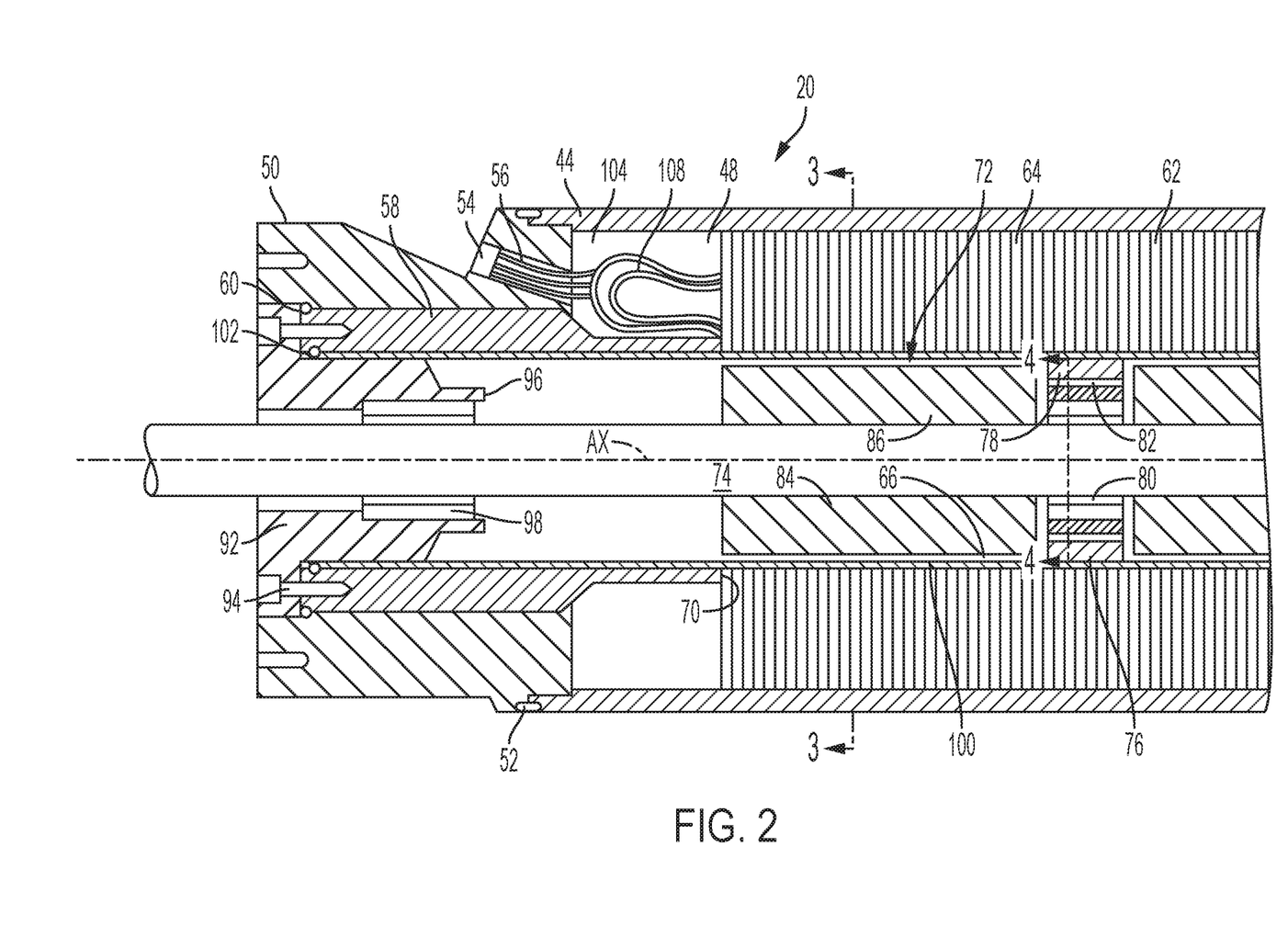
FIG. 2 is a section view of an electrical submersible pump assembly with canned motor, in accordance with an embodiment of this disclosure.

Looking at FIG. 2, motor 20 is an electric motor. Motor 20 may be a long and skinny motor. As used in this disclosure, a long motor is considered to be a motor with an axial length in a range of 0.05 to 10 meters. As used in this disclosure, a skinny motor is considered to be a motor with an outer diameter in a range of 0.025 to 1 meters.

Motor 20 includes motor housing 44. Motor housing 44 is an elongated tubular member that encloses the internal components of motor 20. Motor housing 44 has inner bore 48 and may be open at both an uphole and downhole end. FIG. 2 illustrates a configuration of an axial length of motor 20, the end of which may be the uphole end or the downhole end of motor 20.

A head member 50 may be connected to each of the open ends of motor housing 44. Head member 50 may be a ring shaped member. A portion of head member 50 may be located within motor housing 44 and another portion of head member 50 may protrude outside of motor housing 44. An outer diameter surface of head member 50 may be connected to motor housing 44 in a manner that prevents fluids from passing into the inner bore of motor housing 44 by traveling between head member 50 and motor housing 44. In the example embodiment of FIG. 2, head member 50 is welded to motor housing 44 with weld 52. In alternate embodiments, head member 50 may be connected to motor housing 44 in another manner that sealingly secures head member 50 to motor housing 44, for example, with an adhesive, a threaded lock ring, a metal seal, or a combination thereof.

In some embodiments, head member 50 may include an insulated electrical terminal 54 for connecting a power cable to motor tails 56 within motor housing 44. Electrical power can then be provided to motor 20 by way of the power cable and motor tails 56.

A backup ring 58 may be connected to an inner diameter surface of head member 50. Backup ring 58 may be a ring shaped member. A portion of backup ring 58 may be located within motor housing 44 and another portion of backup ring 58 may protrude outside of motor housing 44. An outer diameter surface of backup ring 58 may be connected to head member 50 in a manner that prevents fluids from passing into the inner bore of motor housing 44 by traveling between backup ring 58 and head member 50. In some implementations, backup ring 58 may be a structural member that may be fitted (for example, slide fitted) over liner (or "can") 100 allowing pressure containment without deformation of the liner. The welded joint 52, 60, and 102 at both head and base may hermetically seal the stator 62 and sealed space 104, which may be filled with epoxy, for example, to improve mechanical strength and thermal efficiency. In the example embodiment of FIG. 2, backup ring 58 is welded to head member 50 with weld 60. In some embodiments, backup ring 58 may be connected to head member 50 in another manner known in the art that seals and secures backup ring 58 to head member 50, for example, with an adhesive.

Stator 62 may be located within motor housing 44. During operation of motor 20, stator 62 may be static relative to motor housing 44. Stator 62 may include stator body 64 that is a generally ring shaped member formed of stator laminations. The stator laminations of stator body 64 may be thin steel sheets of shaped discs that are stacked together to form the axial length of stator body 64. The sheets of the lamination may be unbonded to each other or can be bonded together.

Stator body 64 may have interior cavity 66. Interior cavity 66 extends along central axis Ax of stator 62. Looking at FIG. 3, stator body 64 may further include winding slots 68. Winding slots 68 extend through the axial length of stator body 64. Stator 62 may further include stator windings that are contained within winding slots 68. The stator windings are formed of a number of wires that are wound through winding slots 68 and around stator body 64.

Looking at FIG. 2, backup ring 58 may have internal end 70 that retains stator body 64 within motor housing 44. Rotor assembly 72 is located within interior cavity 66 of stator 62. Rotor assembly 72 includes rotor shaft 74. Rotor shaft 74 may be an elongated member that extends through motor 20 along central axis Ax. During operation of motor 20, rotor shaft 74 rotates within motor housing 44. In embodiments where pump 18 is integrated with motor 20, rotor assembly 72 may include vanes. The vanes rotate with rotor shaft 74 and may pump the production fluids to the earth's surface 14 through wellbore 12. In such an embodiment, a separate pump may not be included in electrical submersible pump assembly 16.

Figure 4:
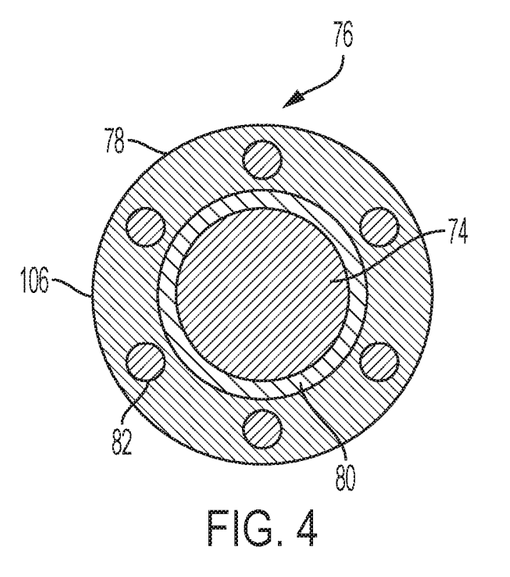
FIG. 4 is a cross section view along 4-4 of the electrical submersible pump assembly of FIG. 2.

Rotor assembly 72 further includes intermediate rotor bearing assembly 76. Intermediate rotor bearing assembly 76 is a ring shaped member and circumscribes rotor shaft 74. During operation of motor 20, intermediate rotor bearing assembly 76 may withstand the radial loads or forces that are perpendicular to rotor shaft 74. Intermediate rotor bearing assembly 76 further accommodates the rotation of rotor shaft 74 relative to stator 62. Looking at FIG. 4 intermediate rotor bearing assembly 76 includes rotor bearing housing 78. Rotor bearing housing 78 is located radially outward of intermediate radial bearing 80. Rotor bearing housing 78 supports intermediate radial bearing 80 within interior cavity 66 of stator 62. Oil transfer holes 82 extend axially through rotor bearing housing 78. Oil transfer holes provide for the flow of fluids, such as oil, axially through interior cavity 66 past rotor bearing housing 78.

Rotor assembly 72 may further include intermediate rotor member 84. Intermediate rotor member 84 circumscribes rotor shaft 74. During operation of motor 20, intermediate rotor member 84 rotates within motor housing 44. Rotor body 86 is a generally ring shaped member. Rotor assembly 72 may be a permanent magnet rotor and have permanent magnets spaced around or within rotor body 86. In some embodiments, rotor assembly 72 may be an induction rotor and have rotor windings spaced around or within rotor body 86, and may include other rotating electromagnetic elements.

In the example embodiment of FIG. 2, bearing housing 92 is secured to backup ring 58 with threaded member 94. Bearing housing 92 may not be sealingly secured to backup ring 58. End bearing 98 may circumscribe rotor shaft 74. End bearing 98 may be a radial bearing able to withstand the radial loads or forces that are perpendicular to rotor shaft 74 and accommodate the rotation of rotor shaft 74 relative to bearing housing 92.

Figure 3:
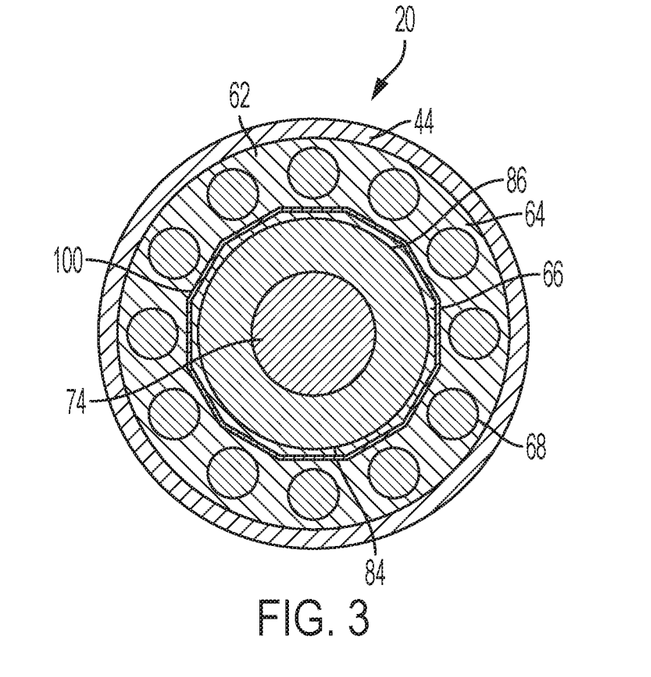
FIG. 3 is a cross section view along 3-3 of the electrical submersible pump assembly of FIG. 2.

Referring to FIGS. 2 and 3, an example liner (or "can") 100 may be located along an interior surface of interior cavity of 66 of stator 62. In some implementations, liner 100 may be secured indirectly to motor housing 44 by way of head member 50 and backup ring 58. Liner 100 may be directly secured to backup ring 58. An outer diameter surface of liner 100 may be connected to backup ring 58 in a manner that prevents fluids from passing into the inner bore of motor housing 44 by traveling between liner 100 and backup ring 58. In the example embodiment of FIG. 2, liner 100 is welded to backup ring 58 with weld 102. In some embodiments, liner 100 may be connected to backup ring 58 in another manner known in the art that sealingly secures liner 100 to backup ring 58, for example, with an adhesive.

Stator 62 may be hermetically sealed from fluids. Hermetically sealed space 104 may be defined by motor housing 44, head member 50, backup ring 58, and liner 100. Because motor housing 44 is sealingly secured to head member 50, head member 50 is sealingly secured to backup ring 58, and backup ring 58 is sealingly secured to liner 100, fluids that are outside of hermetically sealed space 104 are prevented from reaching stator 62. In certain embodiments, hermetically sealed space 104 may be filled with a dielectric oil or may be solid filled to improve the heat transfer and mechanical integrity of the stator windings.

Liner 100 may be a thin walled member. As an example, liner 100 may have a wall thickness in a range of 0.25 millimeters to 1.25 millimeters. In some example embodiments, liner 100 may have a wall thickness of about 0.5 millimeters. Liner 100 may be formed of a non-magnetic material. Liner 100 may be formed, for example, of steel, nickel alloy, thermoplastic, or glass fiber materials. In some embodiments, liner 100 may be formed of stainless steel 316 or Inconnel 625® (a registered mark of Special Metals Corporation). Inconnel 625® may provide the benefit of reduced electrical losses.

Liner 100 may have a polygonal cross section. In the example embodiment of FIG. 3, the cross section of liner 100 has twelve sides. In some embodiments, the cross section of liner 100 may have more or fewer than twelve sides. The greater the number of sides of liner 100, the closer the cross section of liner 100 resembles a circle instead of a polygon. The more liner 100 resembles a circle, the more efficient motor 20 may operate as the gap between stator 62 and rotor body 86 becomes more consistent and may be reduced.

Decreasing the number of sides of liner 100 may improve the capability of liner 100 to prevent rotation of rotor bearing housing 78 relative to stator 62. In some currently available motor assemblies, intermediate bearing housings are prone to rotate within the stator inner diameter, which can lead to heating and failure of the bearing as well as wear of the stator laminations. Looking at FIG. 4, intermediate rotor bearing assembly 76 has a polygonal-shaped outer diameter surface, such as outer series of edges 106, that corresponds to the polygonal cross section of liner 100. The inner diameter shape of intermediate rotor bearing assembly 76 is defined by intermediate radial bearing 80. The inner diameter shape of intermediate radial bearing 80 corresponds to an outer diameter shape of rotor shaft 74. The interaction of the outer series of edges 106 of intermediate rotor bearing assembly 76 and the inner diameter surface of liner 100 may result in intermediate rotor bearing assembly 76 being rotationally static relative to stator 62 while rotor shaft 74 may rotate relative to intermediate rotor bearing assembly 76.

Embodiments of this disclosure may prevent rotation of rotor bearing housing 78 relative to stator 62 while maintaining a simple workbench assembly process of motor 20, which may be particular useful for long and skinny motors. In order to assemble motor 20, intermediate rotor bearing assembly 76 and rotor member 84 may be positioned around and circumscribe rotor shaft 74 to form rotor assembly 72. Stator body 64 may be positioned within motor housing 44. Head member 50 may be sealingly connected to motor housing 44. Motor tails 56 may constitute an integral part of the stator windings. Backup ring 58 may be sealingly connected to head member 50 and liner 100 may be sealingly connected to backup ring 58 to form a hermetically sealed space 104 that contains stator 62 and wire overhangs 108.

Rotor assembly 72 may be pulled into interior cavity 66 of stator body 64 within motor housing 44. Outer series of edges 106 of intermediate rotor bearing assembly 76 may engage the inner diameter surface of liner 100 as rotor assembly 72 is pulled into motor housing 44. The polygonal shape of outer series of edges 106 and inner diameter surface of liner 100 allows rotor assembly 72 to be pulled into motor housing 44 with little resistance and prevents intermediate rotor bearing assembly 76 from rotating relative to motor housing 44. Bearing housing 92 may be secured to backup ring 58 to maintain rotor assembly 72 within motor housing 44.

Motor 20 may be made up with seal section 22 and pump 18 to form electrical submersible pump assembly 16. Electrical submersible pump assembly 16 may then be lowered into subterranean well 10 with deployment string 38. Electrical submersible pump assembly 16 may then be operated to lift production fluids in a direction out of subterranean well 10. If motor 20 requires repair or maintenance, electrical submersible pump assembly 16 may be removed from a wellbore. Rotor assembly 72 may then be pulled out of motor housing 44 in a reverse series of steps described supra.

Embodiments of this disclosure therefore provide systems and methods for hermetically sealing a stator for providing a greater motor life and reduced needs for servicing the motor. Having a rotor cavity that is separate from the stator allows for alternative lubricating fluids and cooling fluids (such as glycol and oils) to be used in the rotor cavity and seal section without the risk of such fluids degrading the stator.

Figure 5:
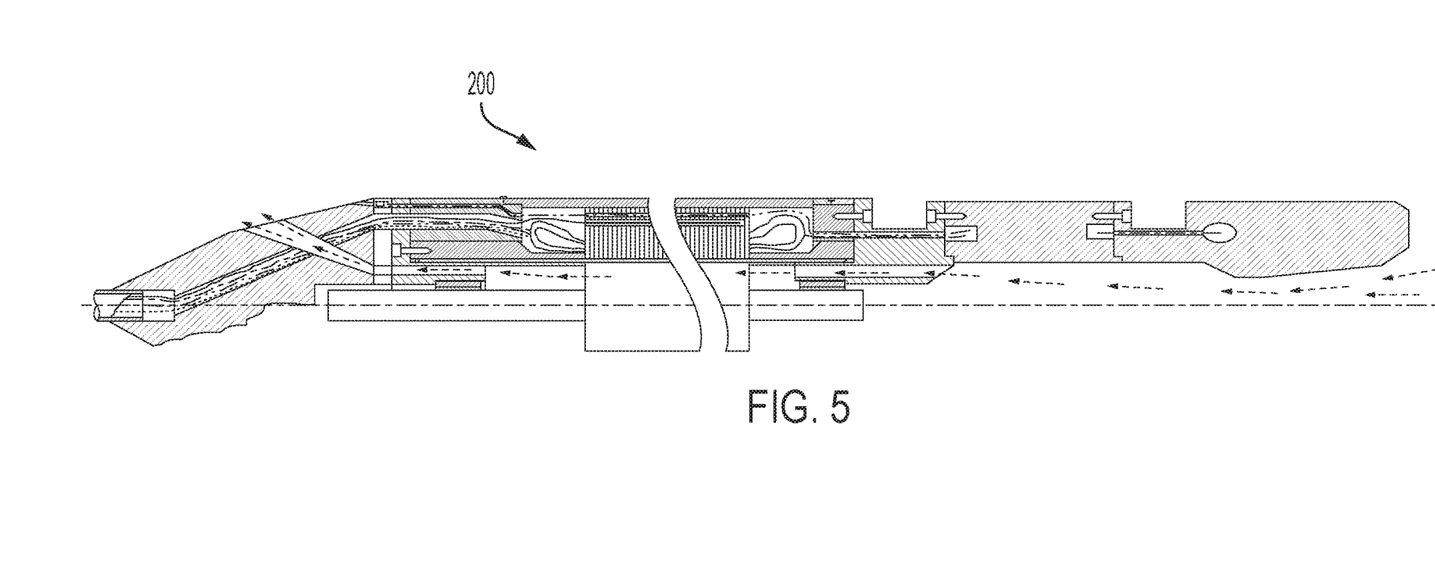
FIG. 5 is an axial cross-sectional view of an electrical submersible pump assembly with canned motor-pump unit and monitoring/controlling system, in accordance with an embodiment of this disclosure.
Figure 6A:
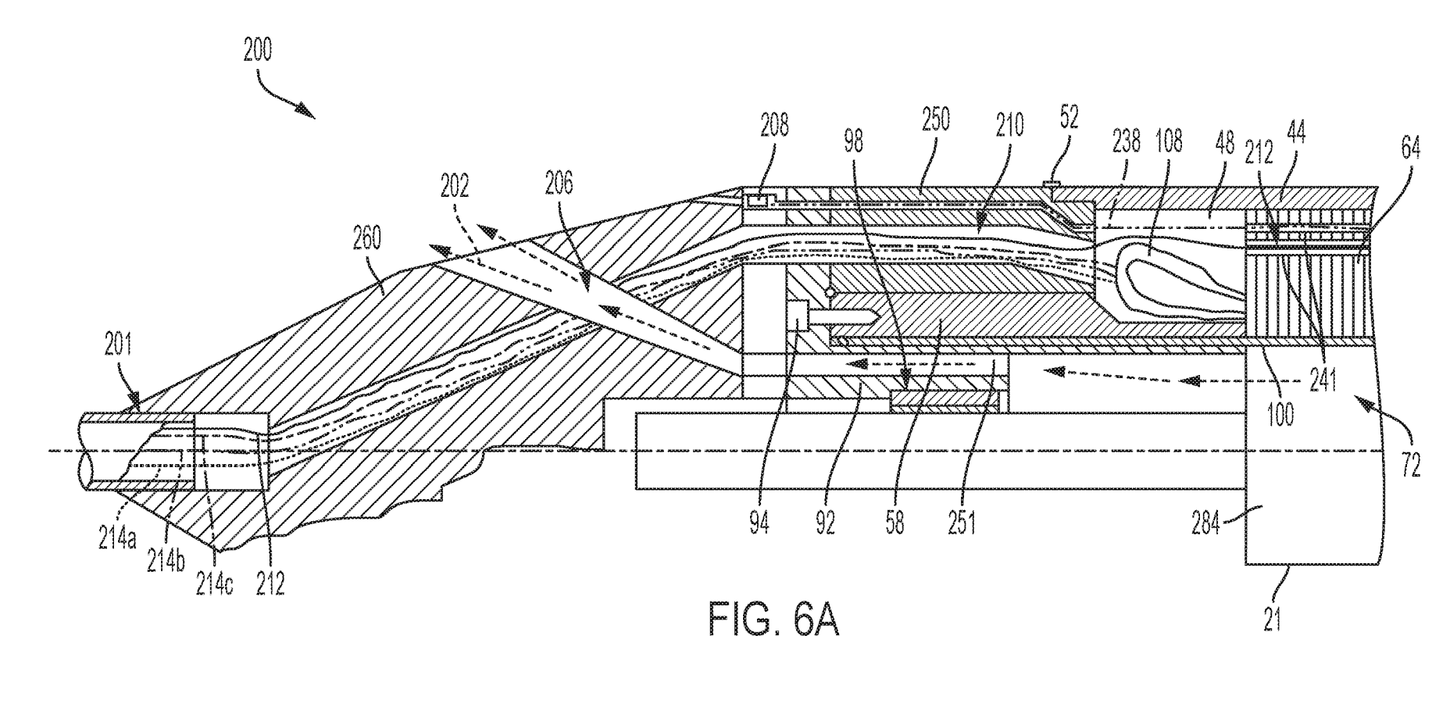
FIGS. 6A and 6B are close-up cross-sectional views of a portion of the electrical submersible pump assembly of FIG. 5.
Figure 6B:
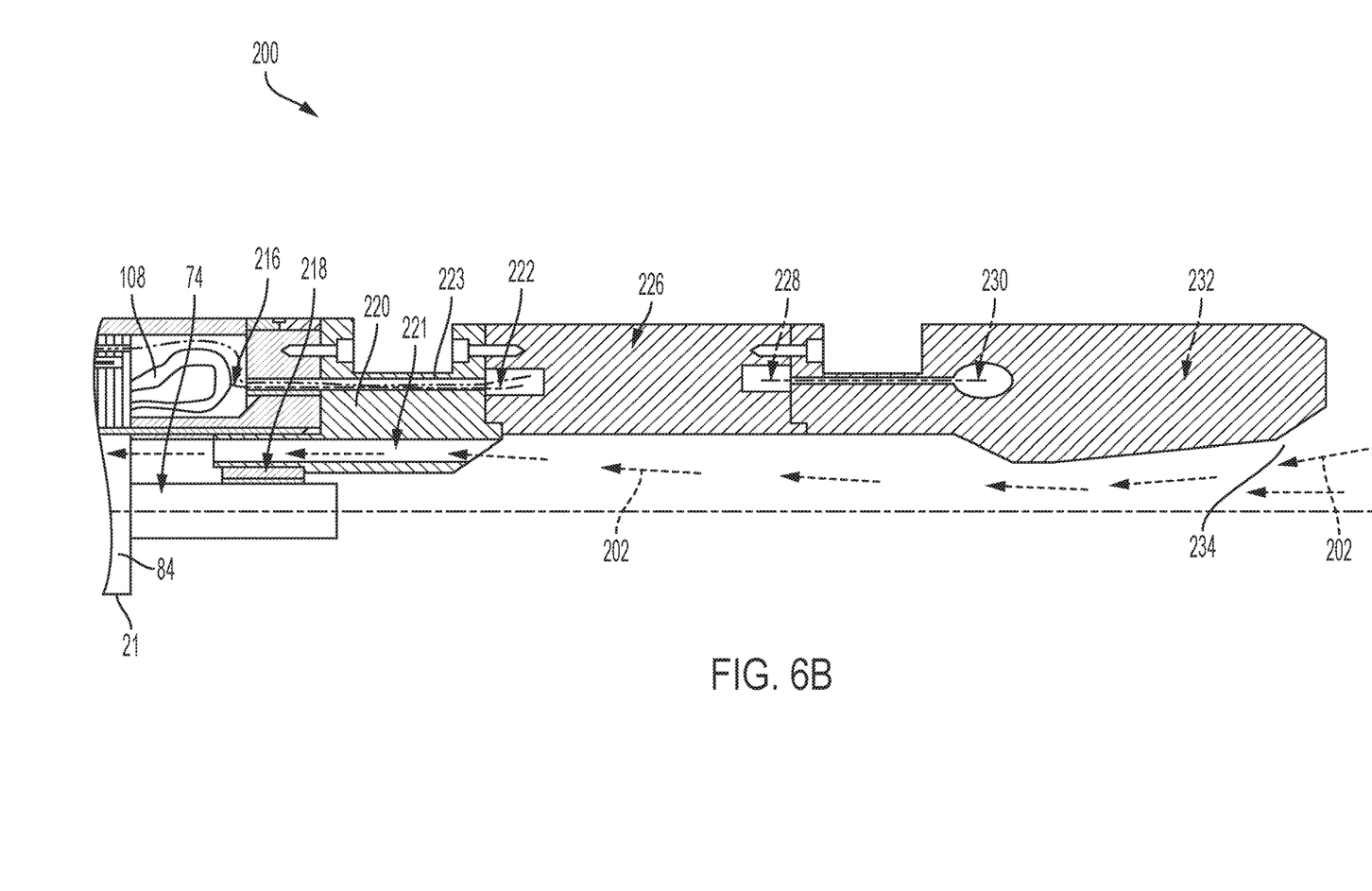

In some embodiments, a power cable deployed canned electric submersible pump assembly (for example, an assembly including a motor 20 or a similar assembly/motor) may be integrated into a cable deployed canned motor pump (CMP) assembly 200. An example CMP assembly 200 is shown in FIGS. 5 and 6A and 6B. In some embodiments, a CMP assembly 200 may include one or more monitoring ancillary devices, for example, a monitoring gauge or a venturi flow meter. A monitoring gauge as described in this specification may house one or more sensors and associated components (for example, wiring, transmitters, or transducers) to measure, for example, vibration, pressure, temperature, water cut (water-oil ratio), flow rate, or fluid density. A canned motor pump arrangement as described in this specification may provide a full-bore conduit at the inlet side (downhole/below the motor and gauge) to enable one or more fluid measurements (for example, measurement of flow rate, which may require conversion of a velocity measurement (meters per second) into a volumetric flow measurement (cubic meters per second). A canned motor pump arrangement as described in this specification may provide an unobstructed ("clean"), full-bore measurement environment that may provide simpler and more accurate flow measurements compared to standard techniques.

Figure 7:
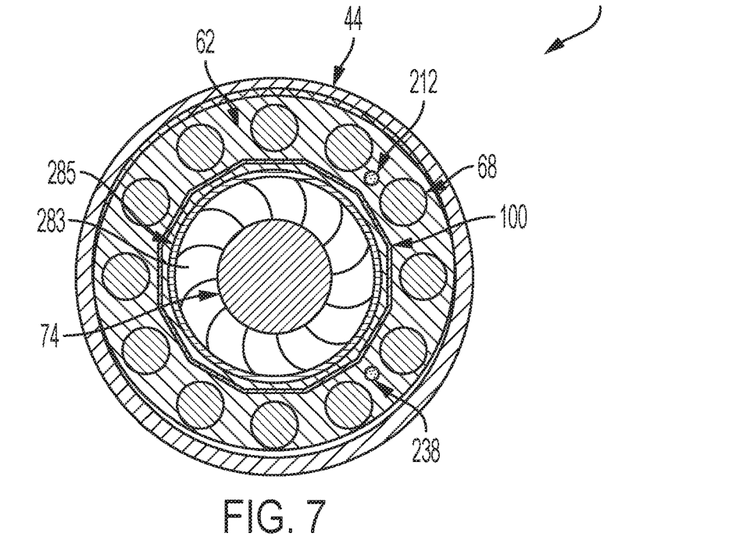
FIG. 7 is a radial cross-sectional view of an example motor pump unit.

In some embodiments, CMP assembly 200 may include a motor-pump unit 21. FIG. 7 shows a cross-section of an example motor-pump unit 21. Motor-pump unit 21 integrates motor and pump components into a single unit, which may allow for a more compact and robust design than a system including separate motor and pump. In some embodiments, a motor or motor components of motor-pump unit 21 may be functionally and structurally similar to motor 20 described in detail supra. In some embodiments, a pump of motor-pump unit 21, at least with regard to its pump components, may be functionally and structurally similar to pump 18. Motor-pump unit 21 may include one or more (centrifugal) pump impellers 283 mounted on shaft 74, for example, disposed adjacent to or between one or more rotor members 84. An impeller 283 may be adapted or configured to circumscribe shaft 74. One or more rotor members 84 and one or more impellers 283 may form a rotating unit 284. Rotating unit 284 may include a permanent magnet rotor and may have permanent magnet(s) spaced around or within a rotor body 86. In some embodiments, rotating unit 284 may include one or more permanent magnets 285 spaced around impeller 283. Motor-pump unit 21 may include one or more non-magnetic polygonal can liners. Such a polygonal liner may house one or more (centrifugal) pump stage diffusers (not shown) of same cross-sectional shape and size as the liner (for example, liner 100), for example, to prevent rotation of the diffuser. One or more diffusers may be slide-fit into a liner 100 for easy assembly. Multiple liner-diffuser-impeller arrangements may be stacked axially end-to-end to form a multi-stage pump. Intermediate rotor bearing assembly 76 may remain rotationally static relative to stator 62 while rotor shaft 74 may rotate relative to intermediate rotor bearing assembly 76, for example, as described supra. In some implementations, intermediate rotor bearing assembly 76 may include or may be part of a diffuser.

In some embodiments, motor-pump unit 21 may include one or more slots, for example, to house one or more cable, lines, or wires, for example, fiber optic line 212 or pressure transducer cable 238, for example, as shown in FIG. 6A. In some embodiments, a fiber optic system including fiber optic line 212 may be used to detect and monitor vibrations, temperature, or strain in one or more components of the CMP assembly 200. For example, a fiber optic system may be used to measure change in vibration, strain or temperature in motor-pump unit 21, wear in one or more bearings, temperature in a cable or wire, or vibration in a cable or wire. In some embodiments, fiber optic line 212 may be part of a (Raleigh scattering based) distributed acoustic sensing (DAS) system, which uses fiber optic cables to provide distributed vibration sensing. In a DAS system, a fiber optic cable may be used as a sensing element. Measurements are made, and in part processed, using an attached optoelectronic device. In some embodiments, Coherent Rayleigh Optical Time Domain Reflectometry (COTDR) in the fiber may be used to determine vibrations or other mechanical stresses or strains. In some embodiments, fiber optic line 212 may be part of a distributed temperature sensing (DTS) system, which uses fiber optic cables as linear sensors to provide distributed temperature sensing. In some embodiments, a DTS system may be based on the temperature-dependent birefringence of a crystal as the temperature transduction mechanism, or may use the temperature-dependent bandgap of a gallium arsenide crystal as the temperature transduction mechanism. In some embodiments, Coherent Rayleigh Optical Time Domain Reflectometry (COTDR) in the fiber may be used to determine temperature. In some embodiments, the same fiber optic line may be used for DAS and DTS. In some embodiments, two or more separate fiber optic lines 212 may be used for DAS and DTS, respectively. In some embodiments, fiber optic line 212 may be part of a fiber optic strain sensing (FOS) system, which uses one or more fiber optic cables to provide deformation information of one or more components of CMP assembly 200. In some implementations, a FOS system may be or include a fiber with Fiber Bragg Grating (FBG), which may be used to determine strain in the fiber based on a change in light reflection from the FBG. In some embodiments, Coherent Rayleigh Optical Time Domain Reflectometry (COTDR) in the fiber may be used to determine strain.

In some embodiments, CMP assembly 200 may be conveyed into a wellbore on a load bearing power cable, for example, a power cable 201. In some embodiments, a power cable 201 may include three electrical power lines or phases (for example, phases 214a, 214b, 214c constituting a three-phase cable system) to conduct electrical power to drive the motor, and may include fiber optic line 212, for example, to connect one or more sensors of CMP assembly 200 to a control unit on the surface (not shown). Example sensors may include one or more sensors to monitor power cable temperature, CMP temperature, vibration, or strain. In some embodiments, CMP assembly 200 may be conveyed into a wellbore on a tubing string, for example, a coiled tubing string.

Figure 8:
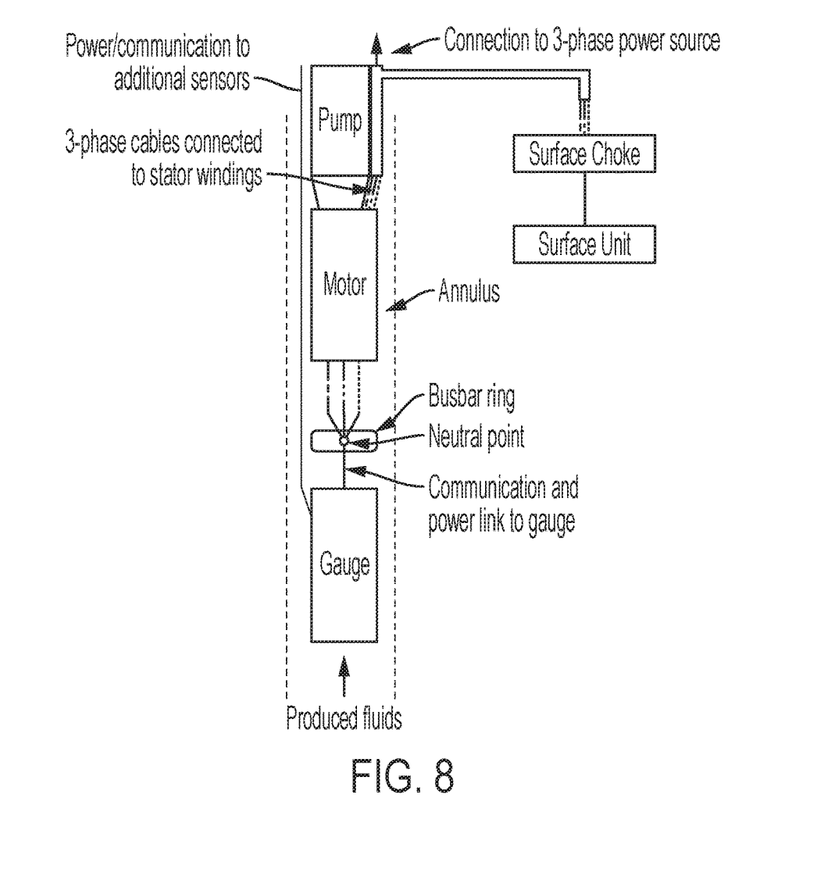
FIG. 8 is a diagram of an example data communication set-up of an example electrical submersible pump assembly.

In some embodiments, CMP assembly 200 may include a CMP gauge 226, for example, as shown in FIG. 6B. An example CMP gauge 226 may have a toroid shape forming an annulus through which fluid may pass from a flow meter 232 toward a port 220 and motor-pump unit 21. An example CMP gauge 226 may be connected to an electronic control unit on the surface (not shown) via a data communication link. A data communication link may be or may include a cable, for example, from a neutral point of the three-phase cable system to CMP gauge 226. In some embodiments, a data communication link may be or may include a separate cable or wire, or may be wireless. In some embodiments, a data communication link may be or may include one or more toroidal current transformers on one or more phases of the three-phase cable system. In such an embodiment, current may be inductively sourced from the three-phase cable system directly without going through a neutral point. Measurement data may then be sent back through the same connection in reverse. A diagram of an example data communication set-up is shown in FIG. 8. Direct current (DC) offset (an offsetting of a signal from zero) on the three phases may cause the neutral point voltage to be non-zero (for example, 110 Volt). A leakage current between this non-zero neutral point and the ground may be used to power the gauge. The data (from the gauge) may be impressed as a current pulse back on the neutral point and transmitted uphole to a surface unit via a surface choke (to create a neutral point at the surface). The data may be registered and read/decoded on the surface by the surface unit (for example, in form of a Morse code).

In some embodiments, CMP gauge 226 may be or may include a strain gauge. The purpose of a strain gauge and strain measurement in general is to measure and provide feedback to the surface about the stress across or along the tool (for example, CMP assembly 200) during downhole movement of the tool and during operation. In some implementations, a decision might be made to set a tool in different location (depth) if significant strain is measured across the tool that could affect the tool's lifetime and performance. Moreover, a decision might be made to change the speed at which a pump is operating if downhole conditions cause stress across or along the tool that may affect pump durability and performance.

In some embodiments, a CMP gauge 226 may be or include one or more gauges or sensors to measure, for example, one or more of: discharge pressure, intake/inlet pressure, intake/inlet temperature, motor winding temperature, vibration (in X, Y, Z direction), electrical current leakage, fluid water cut (for example, water-oil ratio), fluid density, or flow rate. In some embodiments, CMP gauge 226 may be configured to provide data, for example, on pump performance, even if/when one or more sensors fail due to cable ground fault (ground fault tolerant system). In some embodiments, a hollow CMP gauge 226 may be positioned above (uphole of) and at or near fluid intake 234, allowing fluids (for example, produced fluids) to flow as indicated by arrows 202 through an annulus where one or more sensors may be positioned, for example, embedded in a wall of CMP gauge 226 (not shown). Such sensors may include one or more of an intake pressure sensor, a water cut sensor, or a density sensor. The "clean bore" (or unobstructed bore) of CMP gauge 226 may allow integration of several flow and density measurement modalities into one tool. Example measurement modalities include intrusive (immersed in fluid) or non-intrusive devices, or both, and may include V-cone flow meters, vortex flow meters, ultrasound, and thermal anemometry. A combination of these meters may allow the measurement of flow and density independently. In some embodiments, data collected by CMP gauge 226 may transmitted electrically to a control unit on the surface, for example, using a communication power modulation protocol on power cable 214, for example, as described supra.

In some embodiments, CMP assembly 200 may include a flow meter 232 that may be coupled or connected to CMP gauge 226. An example flow meter 232 may have a toroid shape forming an annulus through which fluid may pass from the wellbore toward CMP gauge 226, port 220 and motor-pump unit 21. An example flow meter 232 may include intake 234. A flow meter 232 may be used to monitor (volumetric) flow rate. In some embodiments, if the flow meter 232 includes an intrusive object (for example, a turbine), the intrusive object may be positioned at or near intake 234. An example flow meter 232 may include an electrical connector 230 to connect flow meter 232 to other components of CMP assembly 200, for example, to transducers or sensors included in or attached to motor-pump unit 21. An example flow meter 232 may include an electrical connector 230 to connect flow meter 232 to CMP gauge 226 at CMP gauge connector 228. In some embodiments, connector 230 may be in electrical connection with flow meter 232 and one or more toroidal current transformers on one or more phases (for example, electrical phase 214c). In such an example embodiment, the power may be inductively sourced directly from the three-phase cable. The measurement data may be then sent back through the same connection in reverse.

In some embodiments, CMP gauge 226 may be connected to motor-pump unit 21 via flow port 220. An example flow port 220 may have a toroid shape. A flow port 220 may include a fluid channel 221 to conduct fluid toward rotating unit 284. A flow port 220 may include a conduit 223 to house electrical wiring between CMP gauge 226 and motor 20. In some embodiments, CMP gauge 226 may include an electrical connection, for example, a connector 222, to a stator electric winding neutral point or a connections to a discharge pressure transducer 208, or both. In some embodiments, a connector 222 may be electrically connected to a stator electric winding neutral point or a connection to a discharge pressure transducer 208 via connector 216 of motor-pump unit 21. In some embodiments, discharge pressure transducer 208 is connected to CMP gauge 226 via pressure transducer cable 238, for example, to determine fluid pressure at an internal surface or external surface (facing the wellbore wall) of CMP gauge 226. In some embodiments, pressure transducer 208 may be connected to a conduit (for example, a $1/8^{th}$ inch diameter conduit) that may be connected to a pressure gauge uphole of CMP assembly 200, for example, to obtain a pressure reading (for example, a second pressure reading) uphole. In some embodiments, electrical connection may be established via one or more electrical connectors (not shown) that may allow "plug/play" modular assembly. In some embodiments, flow port 220 may include one or more (rotor shaft) intake bearings. An example intake bearing 218 may be a radial bearing able to withstand the radial loads or forces that are perpendicular to rotor shaft 74 and accommodate the rotation of rotor shaft 74 relative to flow port 220. An example intake bearing 218 may be substantially similar to end bearing 98 described supra.

In some embodiments, a downhole end of motor-pump unit 21 may be connected to an uphole end of flow port 220. In some embodiments, an uphole end of motor-pump unit 21 may be connected to a downhole end of a head member, for example, CMP head member 250. In some embodiments, CMP head member 250 may be structurally and functionally similar to head member 50 described supra. In some embodiments, motor-pump unit 21 may include one or more longitudinal slots 241 substantially parallel to shaft 74. Each of the one or more slots 241 may house one or more cables or wires, for example, fiber optic line 212 or pressure transducer cable 238 connecting pressure transducer 208 to CMP gauge 226. CMP head member 250 may include one or more head conduits 210, which may house one or more wires or cable, for example, three electrical power phases 214a, 214b, 214c.

In some embodiments, an uphole end of CMP head member 250 may be connected to a downhole end of an outlet section 260. Outlet section 260 may include one or more discharge flow ports 206. Fluid may exit CMP assembly 200 through one or more discharge flow ports 206. In some embodiments, discharge pressure transducer 208 may be positioned at or near a first (upstream) end of a discharge flow port 206. In some embodiments, discharge pressure transducer 208 may positioned at or near a second (downstream) end of head member fluid channel 251. In some embodiments, discharge flow port 206 is in fluid communication with head member fluid channel 251 such that fluid exiting form head member fluid channel 251 enters discharge flow port 206 to be discharged from CMP assembly 200.

In some embodiments as described in this specification, some or all instrument lines (for example, cables and wires) may be routed within an outer shell (outer diameter) of CMP assembly 200, for example, through longitudinal slots 241. This configuration provides that the outside surface of CMP may be substantially round/smooth without any protrusion or exterior (signal) lines. This configuration may allow more robust design compared to systems with exterior signal lines, which are prone to damage during installation and operation.

In some example implementations, a system including CMP assembly 200 may replace existing Electric Submersible Pump (ESP) designs, which comprise separate pump and motor and include a protector to keep well fluids out of the motor. Some ESPs may be prone to failure when mechanical seals in the protector fail, allowing wellbore fluids to enter the motor, thereby causing damage to the motor. Moreover, some ESPs, by virtue of their segmented design, tend to be longer than a system with CMP assembly 200, which may reduce applicability of ESPs in curved wellbores. Some ESPs may not include a flowmeter because an instrument line is required between flowmeter at the uphole end of an ESP and a gauge (to monitor downhole pressure, temperature, current leakage, and vibration) at the downhole end of the ESP. This means that the instrument line may be prone to damage during conveyance of the ESP to a set depth in the wellbore.

In some embodiments, a system as described in this specification may have a compact design. For example, a system with CMP assembly 200 may be approximately half the length of an (existing) ESP by virtue of combining pump and motor into one housing. By creating a hollow gauge, for example, CMP gauge 226, downhole of (at the intake to) the motor-pump unit 21, it may be possible to fit a flow meter at or near the intake of the pump. Therefore, no instrument lines may need to be placed outside of the body of CMP assembly 200. A lack of external instrument lines may increase system integrity during installation in a wellbore compared to systems with such external lines.

At least part of the system described in this specification and its various modifications may be controlled by a computer program product, such as a computer program tangibly embodied in one or more information formation carriers. Information carriers include one or more tangible machine-readable storage media. The computer program product may be executed by a data processing apparatus. A data processing apparatus can be a programmable processor, a computer, or multiple computers.

A computer program may be written in any form of programming language, including compiled or interpreted languages. It may be deployed in any form, including as a stand-alone program or as a module, component, subroutine, or other unit suitable for use in a computing environment. A computer program may be deployed to be executed on one computer or on multiple computers. The one computer or multiple computers can be at one site or distributed across multiple sites and interconnected by a network.

Actions associated with implementing the systems may be performed by one or more programmable processors executing one or more computer programs. All or part of the systems may be implemented as special purpose logic circuitry, for example, an field programmable gate array (FPGA) or an ASIC application-specific integrated circuit (ASIC), or both.

Processors suitable for the execution of a computer program include, for example, both general and special purpose microprocessors, and include any one or more processors of any kind of digital computer. Generally, a processor will receive instructions and data from a read-only storage area or a random access storage area, or both. Components of a computer (including a server) include one or more processors for executing instructions and one or more storage area devices for storing instructions and data. Generally, a computer will also include one or more machine-readable storage media, or will be operatively coupled to receive data from, or transfer data to, or both, one or more machine-readable storage media. Machine-readable storage media include mass storage devices for storing data, for example, magnetic, magneto-optical disks, or optical disks. Non-transitory machine-readable storage media suitable for embodying computer program instructions and data include all forms of non-volatile storage area. Non-transitory machine-readable storage media include, for example, semiconductor storage area devices, for example, erasable programmable read-only memory (EPROM), electrically erasable programmable read-only memory (EEPROM), and flash storage area devices. Non-transitory machine-readable storage media include, for example, magnetic disks, for example, internal hard disks or removable disks, magneto-optical disks, and CD-ROM and DVD-ROM disks.

Each computing device may include a hard drive for storing data and computer programs, a processing device (for example, a microprocessor), and memory (for example, RAM) for executing computer programs.

Components of different implementations described in this specification may be combined to form other implementations not specifically set forth in this specification. Components may be left out of the systems described in this specification without adversely affecting their operation.

Embodiments of the disclosure described herein, therefore, are well adapted to carry out the objects and attain the ends and advantages mentioned, as well as others inherent therein. While a presently preferred embodiment of the disclosure may have been given for purposes of disclosure, numerous changes exist in the details of procedures for accomplishing the desired results. These and other similar modifications may readily suggest themselves to those skilled in the art, and are intended to be encompassed within the spirit of the present disclosure and the scope of the appended claims.

What is claimed is:

1. A system for producing fluids from a subterranean well, the system comprising:
    an electrical submersible pump assembly with a motor-pump unit, where the motor-pump unit has:
        a motor housing, the motor housing being an elongated member;
        a stator located within the motor housing, the stator having a stator body with an interior cavity extending along a central axis of the stator;
        a rotor assembly located within the interior cavity of the stator, the rotor assembly comprising a rotor shaft, a rotor member, and an intermediate rotor bearing assembly, where the rotor member and the intermediate rotor bearing assembly circumscribe the rotor shaft;
        an impeller mounted on the rotor shaft and located within the interior cavity of the stator, where the impeller circumscribes the rotor shaft; and
        a liner located along an interior surface of the interior cavity, the liner being a thin walled member that is secured to the motor housing and hermetically seals the stator body from a wellbore fluid; where the liner has a polygonal cross section.

2. The system of claim 1, where the rotor shaft is a rotating elongated member that extends along the central axis of the stator.

3. The system of claim 1, where the intermediate rotor bearing assembly is a ring shaped member with a polygonal shaped outer series of edges that corresponds to the polygonal cross section of the liner and with a radial bearing having an inner diameter shape that corresponds to an outer diameter shape of the rotor shaft.

4. The system of claim 1, where the intermediate rotor bearing assembly is rotationally static relative to the stator and where the rotor shaft rotates relative to the intermediate rotor bearing assembly.

5. The system of claim 1, where the liner is formed of a non-magnetic material.

6. The system of claim 1, where the liner is welded at an uphole end of the motor-pump unit and is welded at a downhole end of the motor-pump unit.

7. The system of claim 1, where the motor-pump unit has an axial length in a range of 0.05 to 10 meters and has an outer diameter in a range of 0.025 to 1 meters.

8. The system of claim 1, where the motor-pump unit comprises a distributed acoustic sensing system, a distributed temperature sensing system, or a fiber optic strain sensing system.

9. The system of claim 1, comprising a CMP gauge, the CMP gauge comprising a pressure sensor, a temperature sensor, a water cut sensor, an electrical current meter, or a flow meter.

10. The system of claim 7, comprising a CMP gauge, where the CMP gauge comprises a V-cone flow meter, a vortex flow meter, an ultrasound probe, or a thermal anemometer.

11. The system of claim 1, comprising a flow meter positioned at an inlet of the system, a CMP gauge in fluid connection with the flow meter, and a flow port in fluid connection with the CMP gauge and in fluid connection with the motor-pump unit, where the system is configured such that fluid enters the system through the flow meter, subsequently traverses the CMP gauge, subsequently traverses the flow port, and subsequently traverses the motor-pump unit.

12. A method for producing fluids from a subterranean well, the method comprising:
    providing an electrical submersible pump assembly with a motor-pump unit and a seal section, where the motor-pump unit has:
        a motor housing, the motor housing being an elongated member;
        a stator located within the motor housing, the stator having a stator body with an interior cavity extending along a central axis of the stator;
        a rotor assembly located within the interior cavity of the stator, the rotor assembly comprising a rotor shaft, a rotor member, and an intermediate rotor bearing assembly, where the rotor member and the intermediate rotor bearing assembly circumscribe the rotor shaft, and where the rotor shaft is an elongated member that extends along the central axis of the stator;
        an impeller mounted on the rotor shaft and located within the interior cavity of the stator where the impeller circumscribes the rotor shaft and
        a liner located along an interior surface of the interior cavity, the liner being a thin walled member that is secured to the motor housing and hermetically seals the stator body from a wellbore fluid, where the liner has a polygonal cross section;
    lowering the electrical submersible pump assembly into the subterranean well with a deployment string;
    operating the electrical submersible pump assembly to lift production fluids in a direction out of the subterranean well.

13. The method of claim 12, further comprising providing the intermediate rotor bearing assembly that is a ring shaped member with a polygonal shaped outer series of edges that corresponds to the polygonal cross section of the liner and with a radial bearing having an inner diameter shape that corresponds to an outer diameter shape of the rotor shaft.

14. The method of claim 12, where operating the electrical submersible pump assembly comprises rotating the rotor shaft, where the rotor shaft rotates relative to the intermediate rotor bearing assembly and the intermediate rotor bearing assembly is rotationally static relative to the stator.

15. The method of claim 12, where the liner is formed of a non-magnetic material.

16. The method of claim 12, where the liner is welded at an uphole end of the motor and is welded at a downhole end of the motor.

17. The method of claim 12, where the motor-pump unit has an axial length in a range of 0.05 to 10 meters and has an outer diameter in a range of 0.025 to 1 meters.

18. The method of claim 12, where the motor-pump unit comprises a distributed acoustic sensing system, a distributed temperature sensing system, or a fiber optic strain sensing system.

19. The method of claim 12, where the submersible pump assembly comprises a CMP gauge, the CMP gauge comprising a pressure sensor, a temperature sensor, a water cut sensor, an electrical current meter, or a flow meter.

20. The method of claim 19, where the CMP gauge comprises a V-cone flow meter, a vortex flow meter, an ultrasound probe, or a thermal anemometer.

21. The method of claim 12, where the submersible pump assembly comprises a flow meter positioned at an inlet of a system comprising the submersible pump assembly, a CMP gauge in fluid connection with the flow meter, and a flow port in fluid connection with the CMP gauge and in fluid connection with the motor-pump unit, where the system is configured such that fluid enters the system through the flow meter, subsequently traverses the CMP gauge, subsequently traverses the flow port, and subsequently traverses the motor-pump unit.

\* \* \* \* \*